(12) United States Patent
Tanaka et al.

(10) Patent No.: US 8,508,511 B2
(45) Date of Patent: Aug. 13, 2013

(54) INPUTTING DEVICE

(75) Inventors: Toshio Tanaka, Fukui (JP); Tsuyoshi Tanaka, Kyoto (JP)

(73) Assignee: Panasonic Corporation, Osaka (JP)

( * ) Notice: Subject to any disclaimer, the term of this patent is extended or adjusted under 35 U.S.C. 154(b) by 1064 days.

(21) Appl. No.: 12/240,122

(22) Filed: Sep. 29, 2008

(65) Prior Publication Data

US 2009/0115748 A1 May 7, 2009

(30) Foreign Application Priority Data

Nov. 7, 2007 (JP) .................................. 2007-289487

(51) Int. Cl.
*G06F 3/033* (2013.01)

(52) U.S. Cl.
USPC ........................................................ 345/184

(58) Field of Classification Search
USPC ........................................................ 345/184
See application file for complete search history.

(56) References Cited

U.S. PATENT DOCUMENTS

| 6,636,197 B1 * | 10/2003 | Goldenberg et al. ......... 345/156 |
| 2005/0156892 A1 * | 7/2005 | Grant ............................. 345/167 |

FOREIGN PATENT DOCUMENTS

| JP | 61-38733 | 3/1986 |
| JP | 2003-308759 | 10/2003 |
| JP | 2006-012695 | 1/2006 |

* cited by examiner

*Primary Examiner* — Alexander S Beck
*Assistant Examiner* — Tony N Ngo
(74) *Attorney, Agent, or Firm* — Wenderoth, Lind & Ponack, L.L.P.

(57) ABSTRACT

An inputting device includes an actuator that can move and rotate, a rotation sensor for detecting a rotation of the actuator, a movement sensor for detecting that the actuator moves to a predetermined position, and a rotation suppressor for preventing the actuator from rotating when the actuator moves to the predetermined position and for allowing the actuator to rotate when the actuator is not positioned at the predetermined position. This input device prevents erroneous operation and performs various operations.

16 Claims, 11 Drawing Sheets

PRIOR ART

PRIOR ART

INPUTTING DEVICE

FIELD OF THE INVENTION

The present invention relates to an inputting device for controlling various electronic apparatuses with a rolling or a sliding of an actuator of the inputting device.

BACKGROUND OF THE INVENTION

An inputting device selects one of plural menus displayed on a display device, such as a liquid crystal display, mounted to a dashboard of a vehicle interior with rolling or sliding of an actuator of the inputting device. An electronic apparatus, such as a car navigation system, an audio device, or an air-conditioner, is controlled according to the selected menu.

Figure 10:
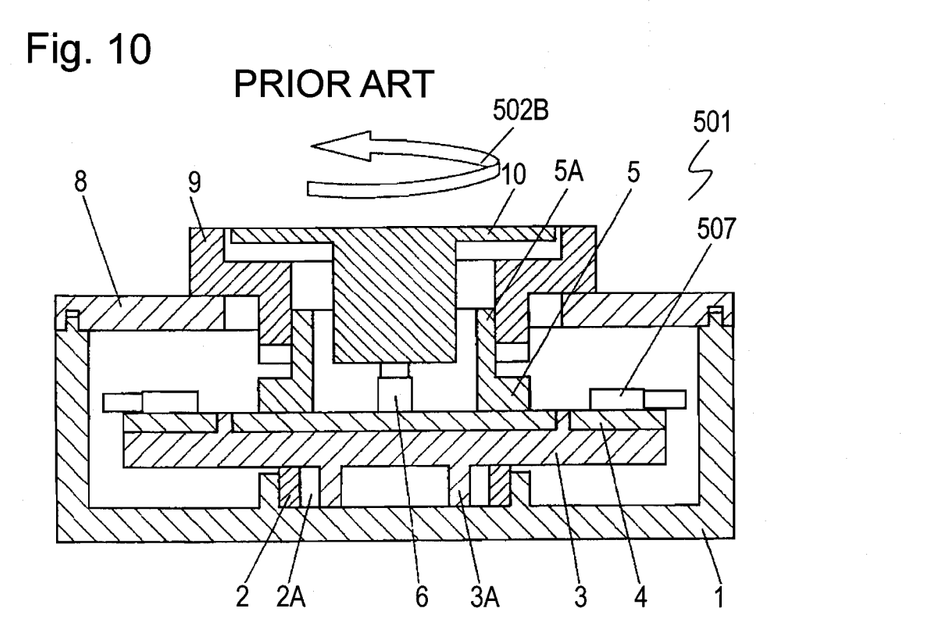
FIG. 10 is a sectional view of a conventional inputting device.
Figure 12:
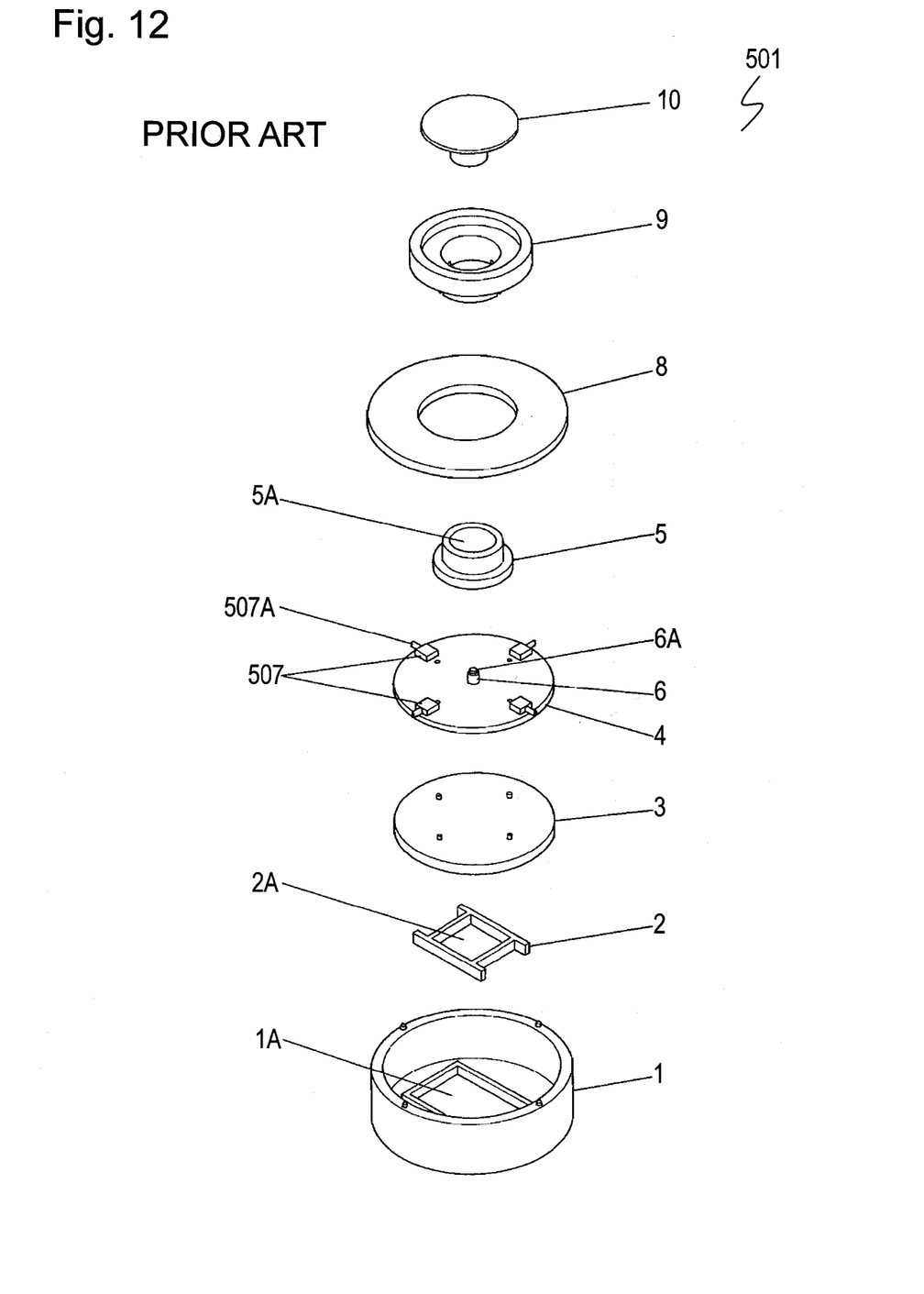
FIG. 12 is an exploded perspective view of the conventional inputting device.

FIGS. 10 and 12 are a sectional view and an exploded perspective view of conventional inputting device 501, respectively. Holder 1A having a rectangular shape and surrounded by a wall is provided at the center of an inner bottom surface of case 1 having substantially a box shape and made of insulating resin. Case 1 opens at its upper surface. Frame 2 having a rectangular shape and made of insulating resin includes a supporting hole 2A having a rectangular shape at the center. Frame 2 is placed in the holder 1A provided at the inner bottom surface of case 1 such that frame 2 can move back and forth within holder 1A. Slider 3 has substantially a disk shape and is made of insulating resin. Wiring board 4 is fixed onto an upper surface of slider 3. Wiring board 4 includes plural conductive patterns on an upper surface and a lower surface thereof. A stopper 3A protruding from the lower surface of slider 3 is inserted into hole 2A to contact the bottom surface of case 1, such that stopper 3A can move to right and left in hole 2A. Slider 3 and wiring board 4 are accommodated in case 1 such that slider 3 and wiring board 4 can laterally move back and forth, and to the right and left in supporting hole 2A.

Rotation sensor 5, such as an encoder, and push switch 6 are mounted onto an upper surface of wiring board 4 by soldering. Plural lever switches 507 are mounted at ends of board 4 along four directions, front, back, right, and left directions, while levers 507A protrude outward. Cover 8 made of insulating resin covers the opening in the upper surface of case 1. A lower end of actuator 9 made of insulating resin is mounted into operation shaft 5A which has a hollow tubular shape. An upper end of actuator 9 protrudes upward from a hole provided in the center of cover 8.

Push button 10 made of insulating resin is mounted into a through-hole formed at the center of actuator 9 such that push button can move up and down in the through-hole. A lower end of push button 10 contacts an upper surface of operation shaft 6A of push switch 6, thus providing inputting device 501.

Inputting device 501 is mounted around a display device, such as a liquid crystal display, placed at the center of a dashboard of a vehicle interior. Rotation sensor 5, push switch 6, and lever switches 507 are coupled to an electronic circuit of a vehicle via connectors and lead wires.

Figure 11:
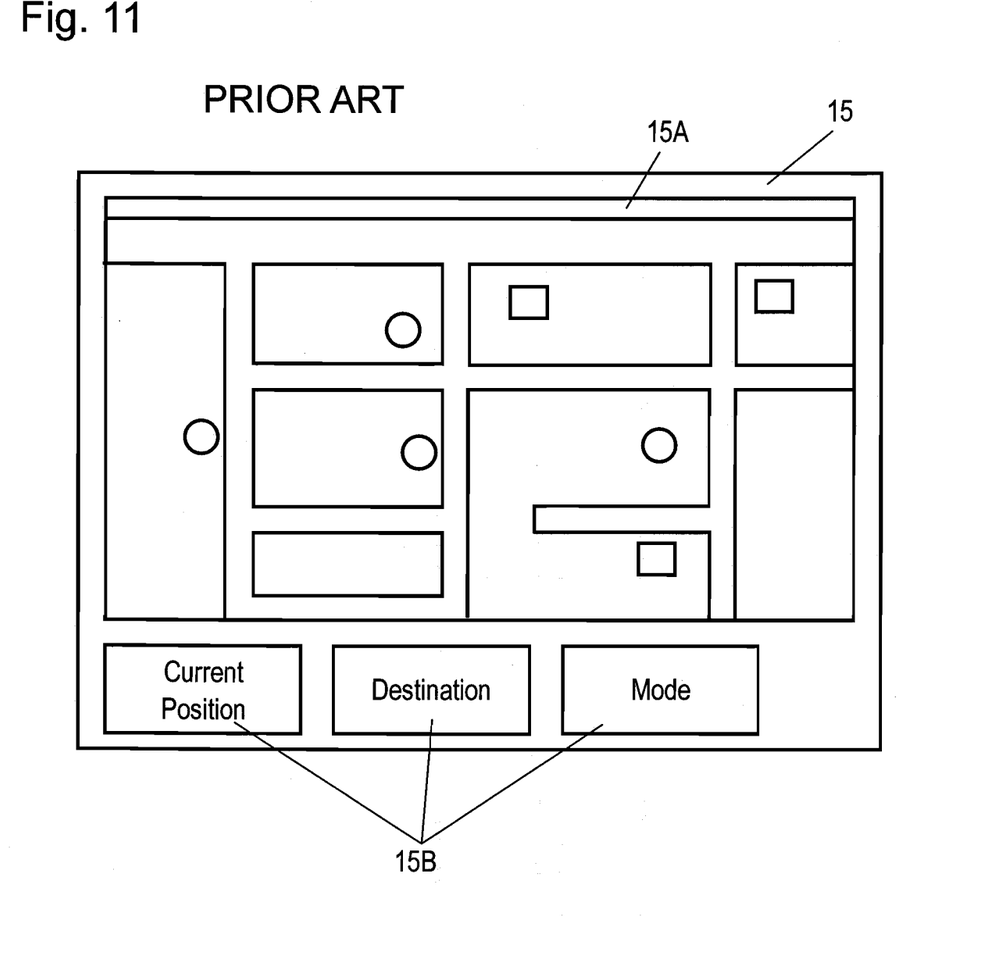
FIG. 11 is a front view of a conventional display device.
Figure 13:
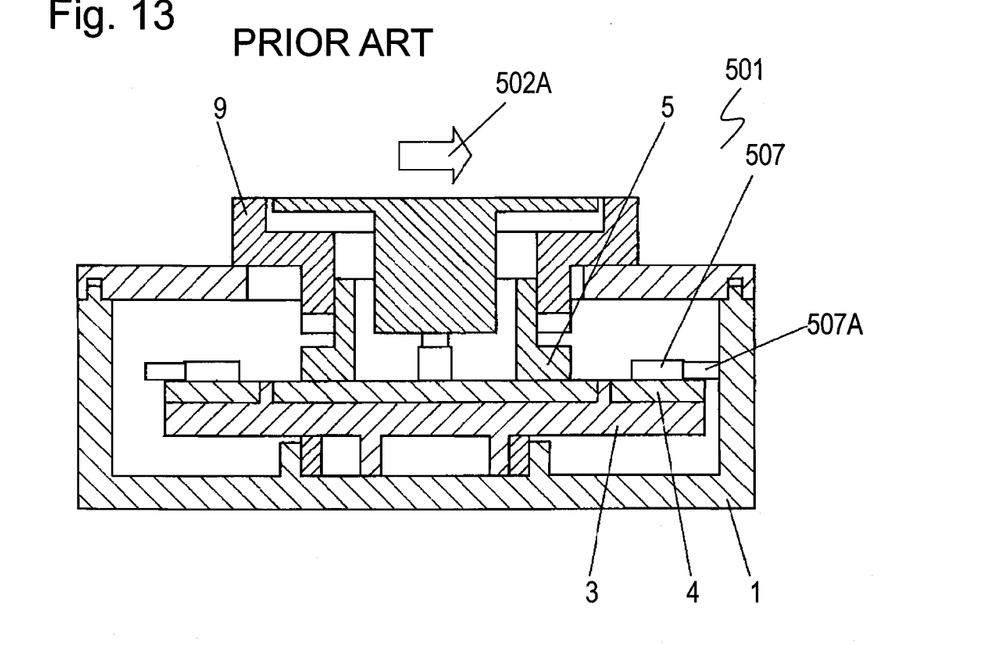
FIG. 13 is a sectional view of the conventional inputting device.
Figure 14:
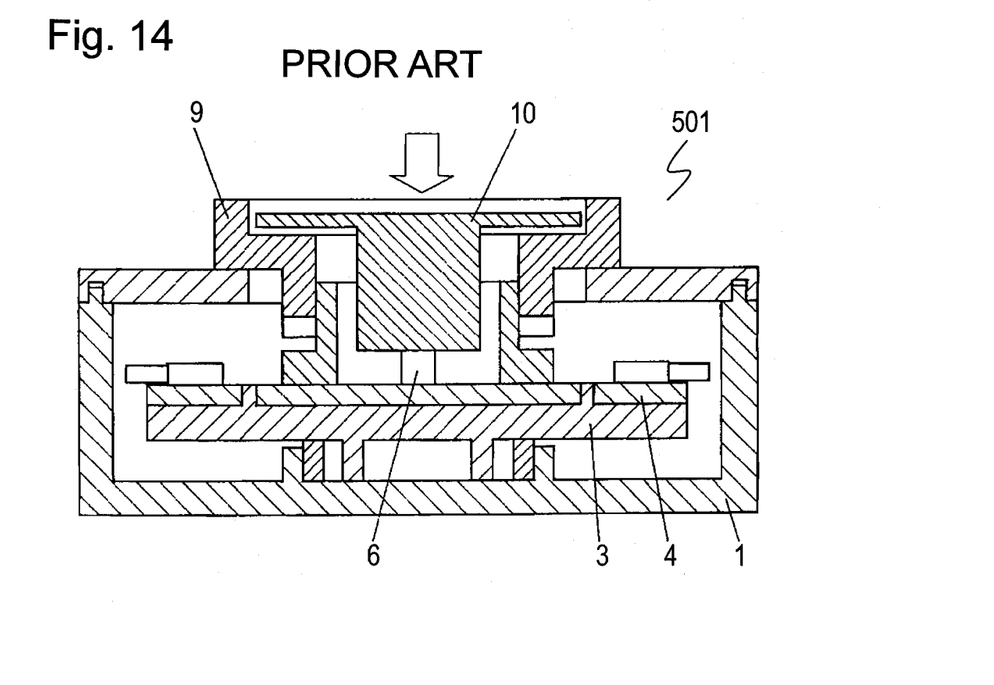
FIG. 14 is a sectional view of the conventional inputting device.

An operation of inputting device 501 will be described below. FIG. 11 is a front view of display device 15 mounted in the vehicle. FIGS. 13 and 14 are sectional views of inputting device 501. While display device 15 displays image 15A of a map, actuator 9 of inputting device is manually slid in right direction 502A to move, in direction 502A, wiring board 4 having rotation sensor 5 mounted thereon and slider 3 fixed to wiring board 4. Then, lever 507A of lever switch 507 mounted on the right end of wiring board 4 contacts a right wall of case 1 for activating lever switch 507.

The activation of lever switch 507 provided at the right end of the wiring board 4 is detected by the electronic circuit of the vehicle, and then, allows the circuit to scroll image 15A displayed on display device 15, so that a right side portion of the map currently displayed is displayed. On the other hand, the sliding of actuator 9 in the left direction opposite to the right direction, in a back direction, or a front direction, moves wiring board 4 and slider 3 in the left direction, or the back direction, or the front direction, and activates lever switch 507 provided on the left end, or the back end, or the front end. The electronic circuit of the vehicle detects the movement of lever switches 507, and scrolls image 15A in, e.g. the left direction. After the sliding of actuator 9 in the left direction, a user having removed a hand from actuator 9, then actuator 9, wiring board 4, and slider 3 are restored to the neutral position shown in FIG. 10 due to a spring provided between holder 1A and frame 2 or between supporting hole 2A and stopper 3A.

The user pinches actuator 9 with fingers and rotates actuator 9 in direction 502B as shown in FIG. 10 to allow a lower end of actuator 9 to rotate operation shaft 5A, so that rotation sensor 5 generates a signal in response to the rotation of shaft 5A. The signal allows the electronic circuit of the vehicle to detect the rotation of shaft 5A, and enlarges and reduces image 15A, the map.

As shown in FIG. 14, push button 10 is pressed with a finger and a lower end of button 10 pushes operation shaft 6A to activate push switch 6. The electronic circuit then detects the activation of push switch 6, and switches the menu including plural options 15B displayed at the lower side of display device 15.

As discussed above, inputting device 501 has actuator 9 that can be slid and rotated, and has push button 10 that can be pressed, thereby performing various operations.

When the user slides actuator 9 of conventional inputting device 501, the user may rotate actuator 9. In this case, the map is scrolled, and simultaneously, is unintentionally enlarged or reduced. Particularly in the case that operation shaft 5A of rotation sensor 5 rotates with a small force, such an erroneous operation may occur.

SUMMARY OF THE INVENTION

An inputting device includes an actuator that can rotate about a rotation axis and move perpendicular to the rotation axis, a rotation sensor for detecting a rotation of the actuator, a movement sensor for detecting that the actuator moves to a predetermined position, and a rotation suppressor for preventing the actuator from rotating when the actuator moves to the predetermined position and for allowing the actuator to rotate when the actuator is not positioned at the predetermined position.

This input device prevents erroneous operation and performs various operations.

DESCRIPTION OF THE PREFERRED EMBODIMENTS

Exemplary Embodiment 1

Figure 1:
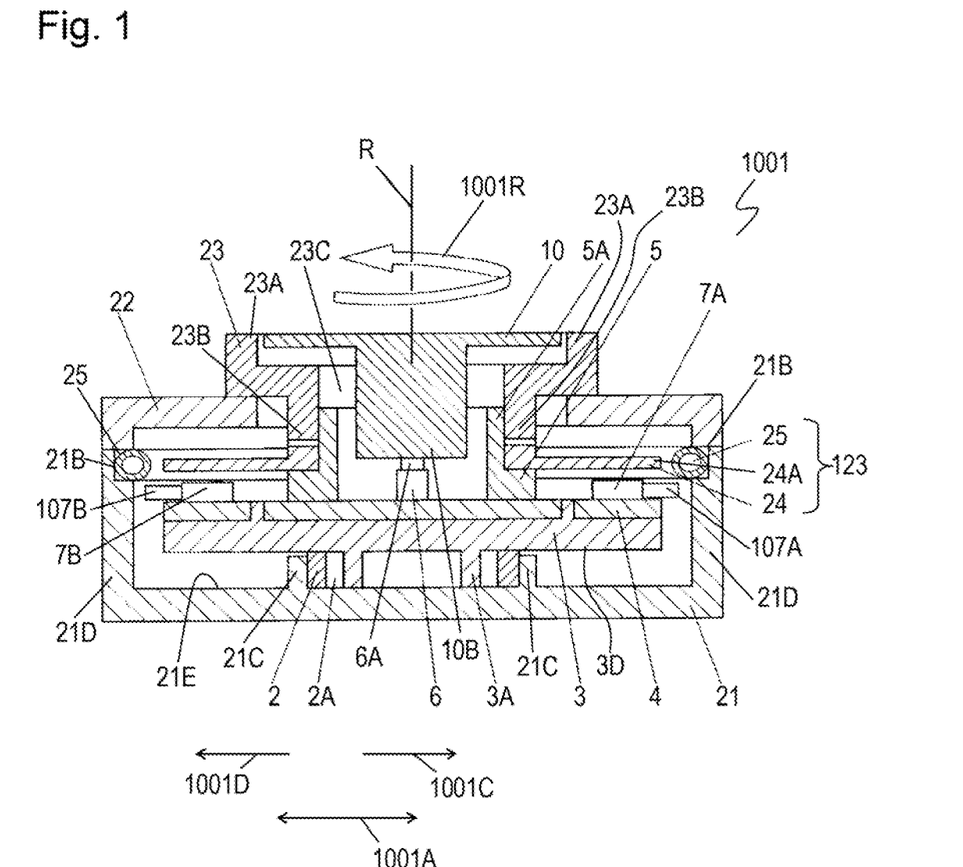
FIG. 1 is a sectional view of an inputting device in accordance with Exemplary Embodiment 1 of the present invention.
Figure 2:
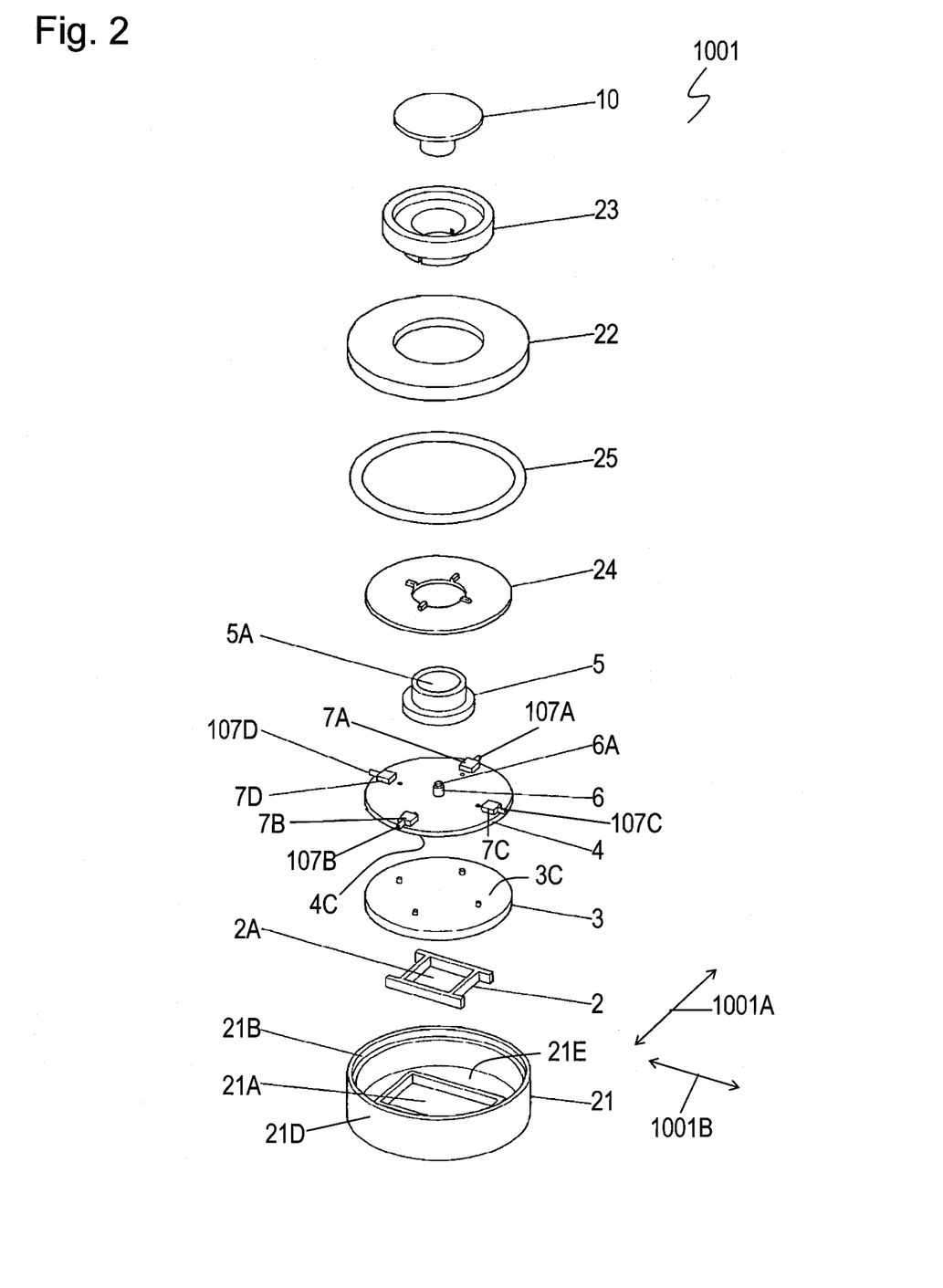
FIG. 2 is an exploded perspective view of the inputting device in accordance with Embodiment 1.

FIGS. 1 and 2 are a sectional view and an exploded perspective view of inputting device 1001 in accordance with exemplary Embodiment 1 of the present invention, respectively. Case 21 made of insulating resin has a box shape with an upper surface opening. Holder 21A having a rectangular shape and surrounded by wall 21C is provided at the center of inner bottom surface 21E of case 21. Frame 2 having a rectangular shape and made of insulating resin has rectangular supporting hole 2A at the center. Frame 2 is placed in holder 21A of case 21 such that frame 2 can move in back and forth directions along direction 1001B in holder 21A.

Slider 3 having a disk shape is made of insulating resin. Wiring board 4 is fixed onto upper surface 3C of slider 3. Wiring board 4 has conductive patterns on an upper surface and a lower surface thereof. Stopper 3A protrudes from lower surface 3D of slider 3, and is inserted into hole 2A to contact inner bottom surface 21E of case 21 such that stopper 3A can move to the right and left in hole 2A. Slider 3 and wiring board 4 are accommodated in case 1 such that slider 3 and wiring board 4 can move in hole 2A in back and front directions along direction 1001B, and in right and left directions along direction 1001A perpendicular to direction 1001B. Directions 1001A and 1001B are in parallel with inside bottom surface 21E of case 21. Holder 21A, frame 2, supporting hole 2A, and stopper 3A have rectangular shapes to prevent slider 3 and wiring board 4 from rotating with respect to case 21.

Rotation sensor 5, such as an encoder, and push switch 6 are mounted onto upper surface 4C of wiring board 4 by soldering at the center. Lever switches 7A and 7B are mounted to both ends of surface 4C along direction 1001A by soldering. Lever switches 7C and 7D are mounted to both ends of surface 4C along direction 1001B by soldering. Lever switches 7A to 7D include levers 107A to 107D protruding outward, respectively.

Cover 22 made of insulating resin covers the opening of case 21. The cover 22 and casing 21 together constitute a casing. Lower end 23B of actuator 23 made of insulating resin is mounted into operation shaft 5A having a hollow tubular shape. Upper end 23A of actuator 23 protrudes upward from a hole formed in the center of cover 22. Actuator 23 can rotate about a rotation axis along rotating direction 1001R, and can move along directions 1001A and 1001B perpendicular to the rotation axis R and in parallel with a rotating plane including rotating direction 1001R.

Movable body 24 made of insulating resin is fixed to lower end 23B of actuator 23, and includes outer end 24A protruding toward side wall 21D of case 21. Ring 25 made of material, such as silicone rubber or elastomer, having a high frictional coefficient is provided in groove 21B formed in an upper end of side wall 21D. Inner wall 25A of ring 25 faces outer end 24A of movable body 24 with a predetermined gap between inner wall 25A and outer end 24A.

Push button 10 made of insulating resin is mounted into a through-hole formed in a center of actuator 23 such that push button 10 can move up and down in the through-hole. Lower end 10B of push button 10 contacts operation shaft 6A of push switch 6, thus providing inputting device 1001.

Figure 3:
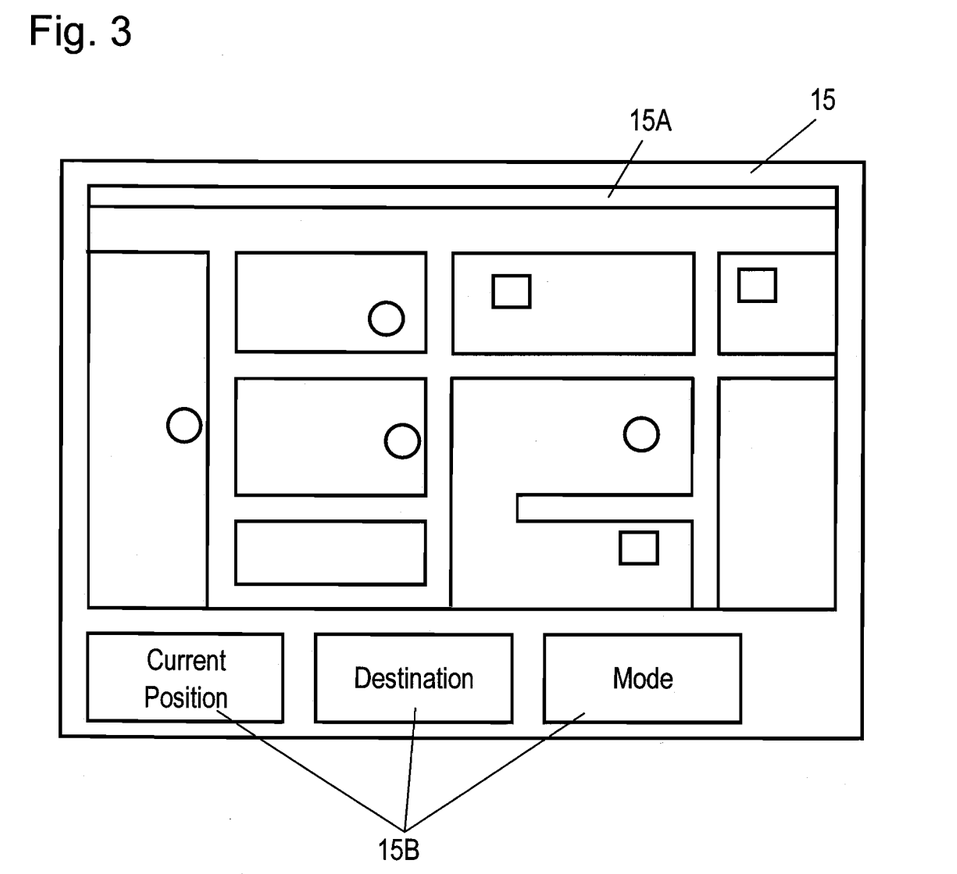
FIG. 3 is a front view of a display device in accordance with Embodiment 1.

FIG. 3 is a front view of display device 15 in accordance with Embodiment 1. Display device 15 includes a displaying element, such as a liquid crystal display, and is mounted as a car navigation system to a center of a dashboard of a vehicle interior. Inputting device 1001 is mounted around display device 15. Rotation sensor 5, push switch 6, lever switches 7A to 7D are coupled to an electronic circuit of a vehicle via connectors and lead wires. Display device 15 displays image 15A, such as a map, as well as a menu including plural options 15B.

Figure 4:
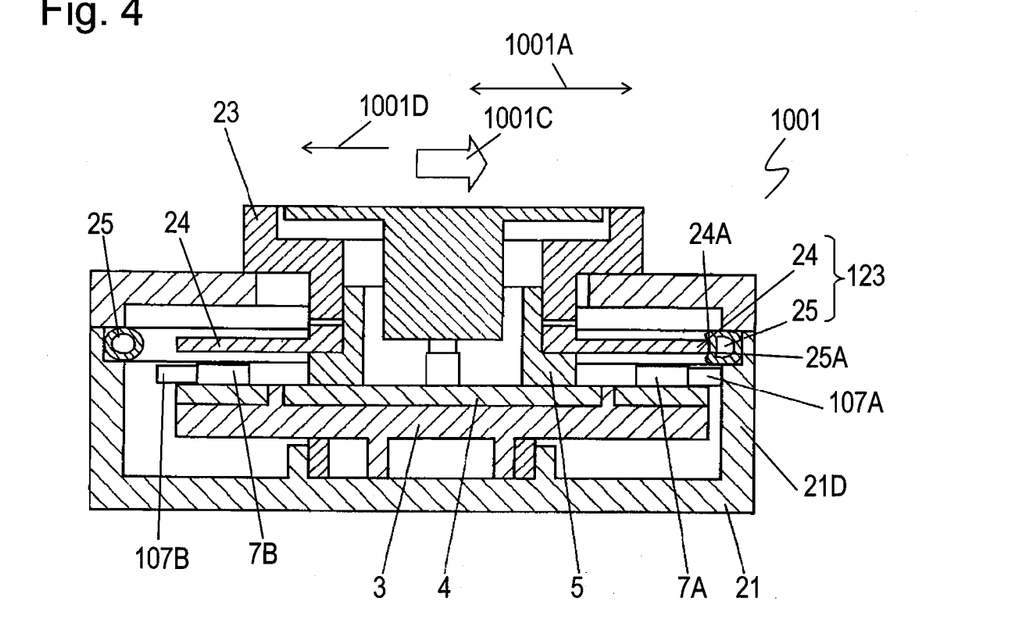
FIG. 4 is a sectional view of the inputting device in accordance with Embodiment 1.
Figure 5:
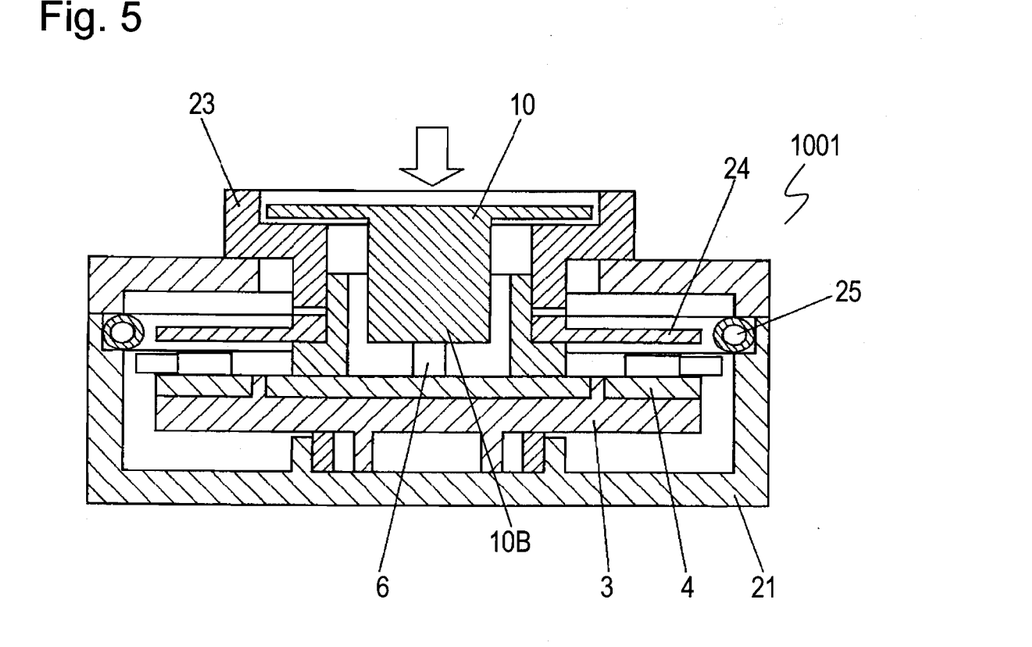
FIG. 5 is a sectional view of the inputting device in accordance with Embodiment 1.

An operation of inputting device 1001 will be described below. FIGS. 4 and 5 are sectional views of inputting device 1001 for illustrating the operation of input device 1001.

While display device 15 displays image 15A as shown in FIG. 3, actuator 23 is slid manually toward the right along direction 1001C in parallel with direction 1001A, as shown in FIG. 4, to move slider 3 and wiring board 4 having rotation sensor 5 and lever switches 7A to 7D mounted thereon toward the right along direction 1001C. Then, lever 107A of lever switch 7A mounted at an end of wiring board 4 along direction 1001C contacts side wall 21D of case 21 for activating lever switch 7A. The activation of lever switch 7A allows the electronic circuit of the vehicle to detect that actuator 23 moves toward the right along direction 1001C, and to scroll image 15A, such as a map, displayed on display device 15, so that a right side portion of the map from a portion currently displayed is displayed.

At this moment, movable body 24 fixed to lower end 23D of actuator 23 moves toward the right along direction 1001C, so that right end 24A of movable body 24 resiliently urges against ring 25 and applies a pushing force to ring 25, causing ring 25 to deform. This pushing force and a frictional force of ring 25 prevent movable body 24 from moving along rotating direction 1001R of actuator 23 perpendicular to direction 1001C. Thus, when actuator 23 moves along direction 1001C, ring 25 resiliently contacting end 24A is operable to prevent movable body 24, i.e., actuator 23, from rotating with respect to case 21. In other words, movable body (actuator-side rotation suppressor portion) 24 and ring (casing-side rotation suppressor portion) 25 function as rotation suppressor 123 for preventing actuator 23 from rotating with respect to case 21. Since actuator 23 cannot rotate during the activation of lever switch 7A, rotation suppressor 123 prevents undesired operation other than desired operations, such as the scrolling of image 15A.

When actuator 23 is moved toward the left along direction 1001D, or along a direction in parallel with direction 1001B, wiring board 4 and slider 3 move along the same direction as actuator 23 to activate one of lever switches 7B to 7D mounted to wiring board 4. The electronic circuit detects the activation of lever switches 7B to 7D, and scrolls image 15A, i.e. the map, toward the left or vertically display device 15.

When lever switches 7B to 7D are activated, outer end 24A of movable body 24 resiliently contacts ring 25 to apply a force to prevent movable body 24 from rotating, and is operable to prevent movable body 24 and actuator 23 from rotating. In other words, when actuator 23 is moved, movable body 24 and ring 25 function as rotation suppressor 123 to prevent actuator 23 from rotating with respect to case 21. Since actuator 23 thus cannot rotate during the activation of any one of lever switches 7A to 7D, rotation suppressor 123 prevents undesired operations other than desired operations, such as the scroll of image 15A. Lever switches 7A to 7D function as a movement sensor for detecting that actuator 23 moves to predetermined positions where lever switches 7A to 7D are activated, respectively. As illustrated in the drawings (see especially FIGS. 1, 4 and 5), the casing, the actuator, and the rotation suppressor are arranged such that the shortest distance between the actuator-side rotation suppressor portion and the casing-side rotation suppressor portion in the predetermined movement direction perpendicular to the rotation axis is shorter than the shortest distance between the actuator and the casing in the predetermined movement direction perpendicular to the rotation axis.

After actuator 23 moves to the predetermined positions, a user having removed a hand from actuator 23, actuator 23, movable body 24, wiring board 4, and slider 3 are restored to a neutral position as shown in FIG. 1 due to a spring provided between holder 21A and frame 2 or between hole 2A and stopper 3A of slider 3.

While image 15A, such as a desired portion of the map, is displayed on display 15, the user pinches actuator 23 with fingers and rotates along direction 1001R shown in FIG. 1 to allow lower end 23D of actuator 23 to rotate operation shaft 5A, so that rotation sensor 5 senses the rotation. The electronic circuit detects the rotation of shaft 5A, and enlarges or reduces the map, i.e. image 15A, currently displayed.

As shown in FIG. 1, when actuator 23 and movable body 24 are restored to the center of case 21, i.e. the neutral position, in other words, when switches 7A to 7D are not activated, outer end 24A of movable body 24 is positioned away from ring 25 to provide a predetermined gap between end 24A and inner wall 25A of ring 25, consequently allowing actuator 23 to rotate smoothly.

As shown in FIG. 5, the user presses push-button 10 placed at the center of actuator 23 with a finger, and causes lower end 10B of button 10 to push operation shaft 6A to activate push switch 6. The electronic circuit detects the activation of push switch 6, and, e.g. switches the menu including plural options 15B displayed at the lower portion of display device 15. Thus, inputting device 1001 has actuator 23 rotated and slid, and has push button 10 pressed, thereby performing various operations.

Actuator 23 can be thus moved and rotated. Rotation sensor 5 detects the rotation of actuator 23. Lever switches 7A to 7D functioning as the movement sensor detect that actuator 23 moves to the predetermined positions where lever switches 7A to 7D are activated, respectively. Rotation suppressor 123 prevents actuator 23 from rotating when actuator 23 moves to the predetermined positions, and allows actuator 23 to rotate when actuator 23 is positioned away from the predetermined positions.

Rotation suppressor 123 that prevents the rotation of actuator 23 upon actuator 23 moving prevents erroneous operations, i.e., actuator 23 from rotating erroneously, thus allowing inputting device 1001 to perform various operations reliably and easily.

Exemplary Embodiment 2

Figure 6:
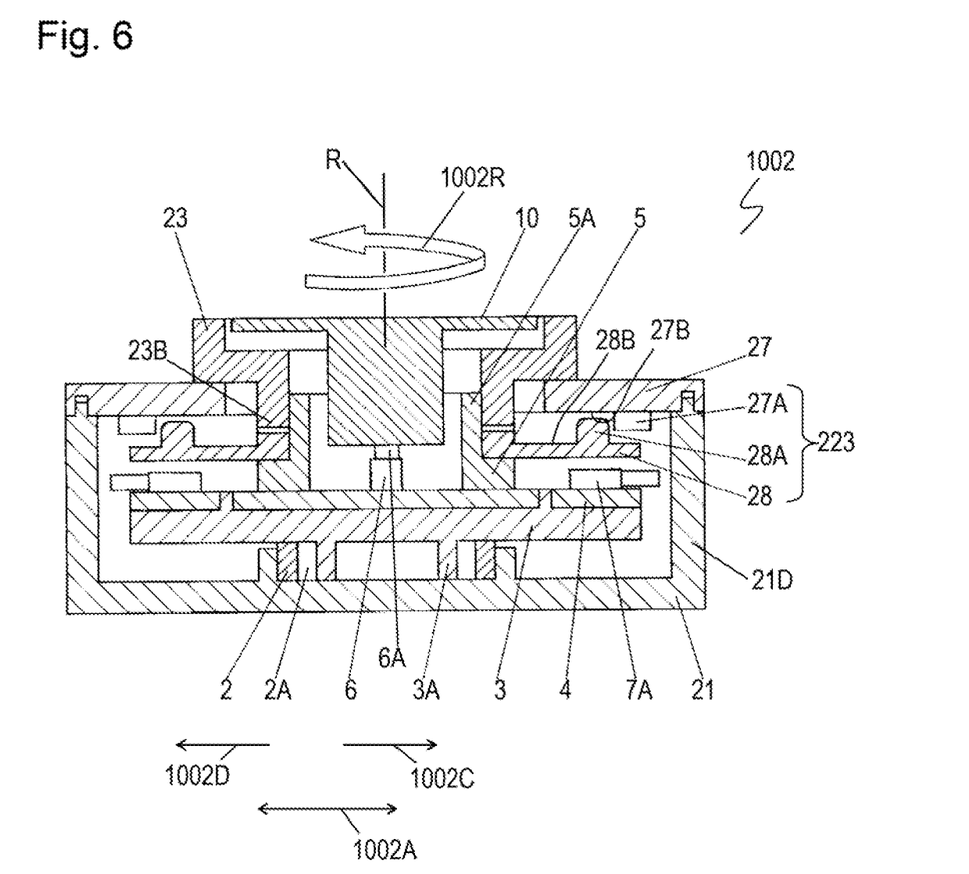
FIG. 6 is a sectional view of an inputting device in accordance with exemplary Embodiment 2 of the invention.
Figure 7:
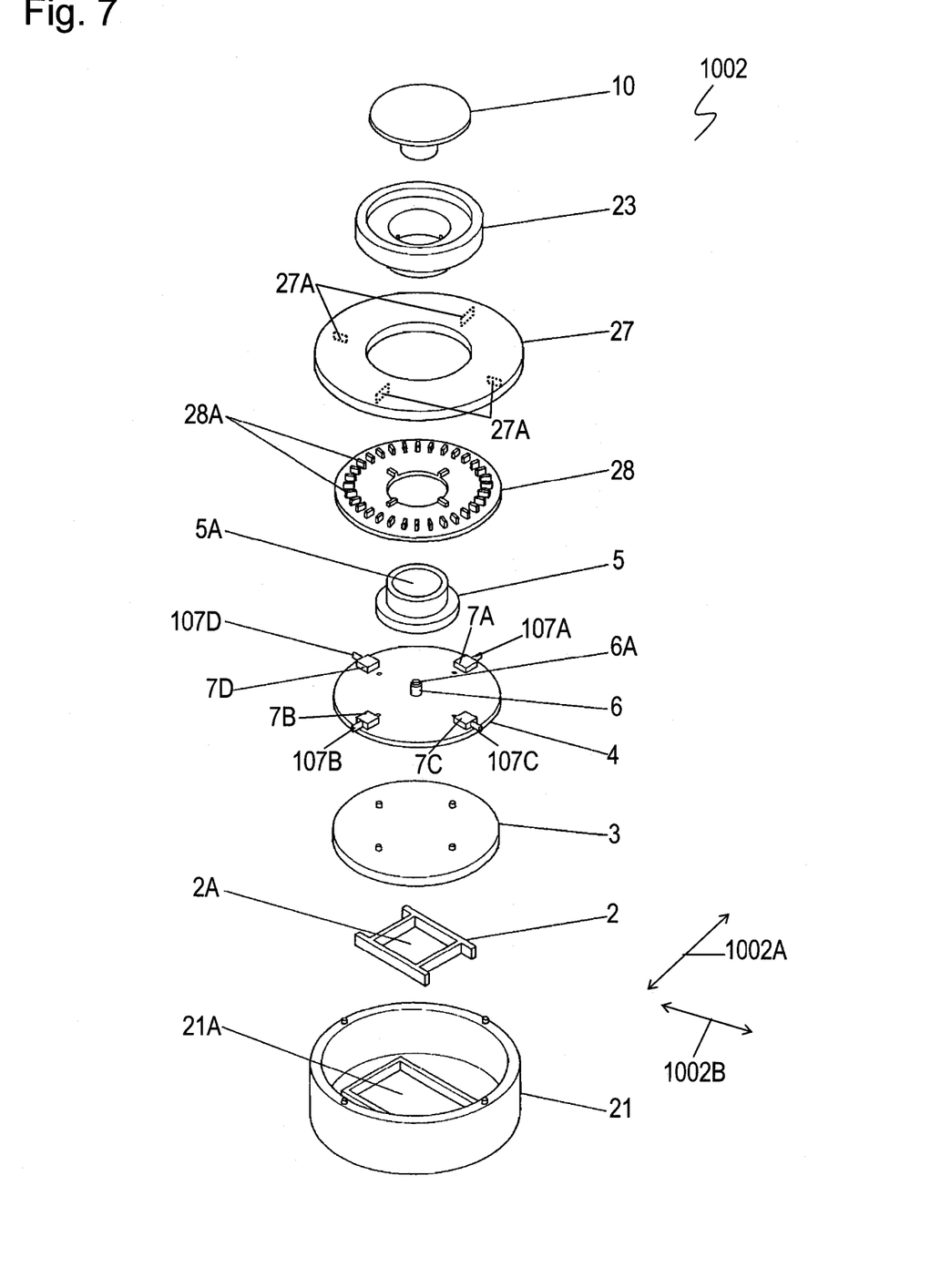
FIG. 7 is an exploded perspective view of the inputting device in accordance with Embodiment 2.

FIGS. 6 and 7 are a sectional view and an exploded perspective view of inputting device 1002 in accordance with Exemplary Embodiment 2 of the present invention, respectively. In FIGS. 6 and 7, components identical to those of inputting device 1001 according to Embodiment 1 are denoted by the same reference numerals, and their description will be omitted.

Inputting device 1002 in accordance with Embodiment 2 includes movable body 28 made of insulating resin and cover 27 instead of ring 25, movable body 24, and cover 22 of inputting device 1001 in accordance with Embodiment 1. Projections 27A are provided on lower surface 27B of cover 27. Projections 28A protruding upward are provided on a circumference of upper surface 28B of movable body 28 at predetermined intervals. Movable body 28 is fixed to lower end 23D of actuator 23.

Projections 27A are provided on the circumference, at four positions, i.e., front, rear, right, and left positions, of lower surface 27B of cover 27 facing upper surface 28B of movable body 28. Each projection 27A has a width smaller than the interval between projections 28A adjacent to each other. Projections 27A and 28A function as rotation suppressor 223 for preventing actuator 23 from rotating. Actuator 23 can rotate along rotating direction 1002R and move along directions 1002A and 1002B in parallel with a rotating plane including rotating direction 1002R. Projections 27A constitute a casing-side rotation suppressor portion, and movable body 28 with projections 28A constitutes an actuator-side rotation suppressor portion.

Figure 8:
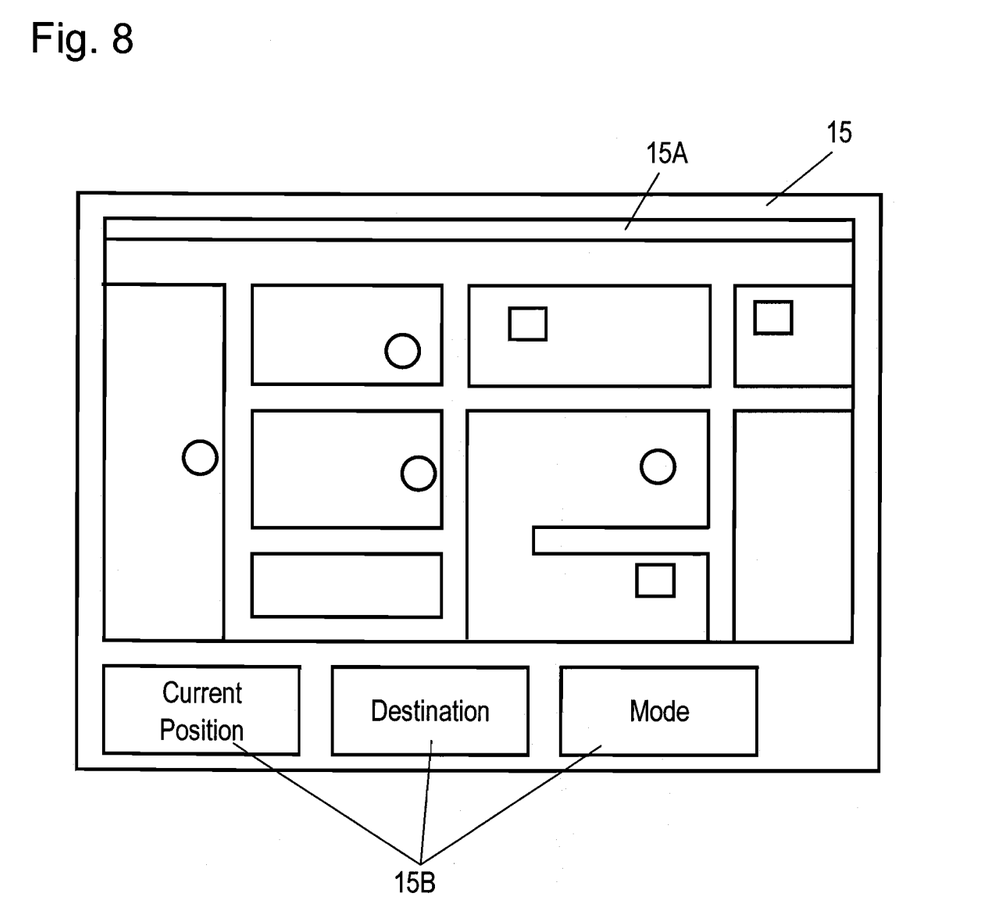
FIG. 8 is a front view of a display device in accordance with Embodiment 2.

FIG. 8 is a front view of display device 15 in accordance with Embodiment 2. Display device 15 includes a displaying element, such as a liquid crystal display, and is mounted as a car navigation system to a center of a dashboard of a vehicle interior. Inputting device 1002 is mounted around display device 15. Rotation sensor 5, push switch 6, and lever switches 7A to 7D are coupled to an electronic circuit of a vehicle car via connectors and lead wires. Display device 15 can display image 15A, such as a map, and a menu including plural options 15B.

Figure 9:
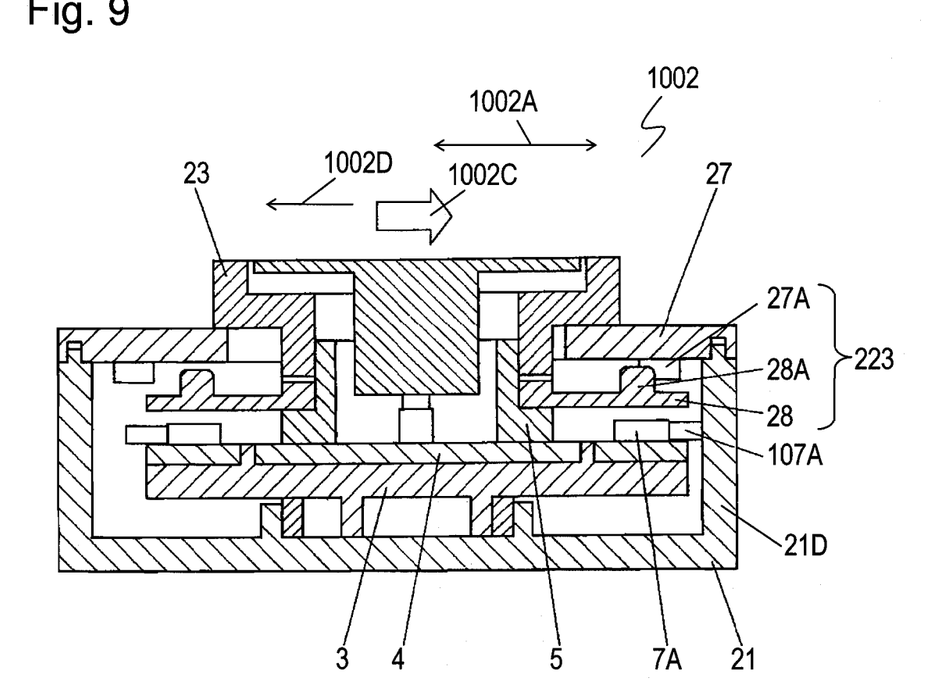
FIG. 9 is a sectional view of the inputting device in accordance with Embodiment 2.

An operation of inputting device 1002 will be described below. FIG. 9 is a sectional view of inputting device 1002 for illustrating the operation. While display device 15 displays image 15A, as shown in FIG. 9, the actuator 23 is slid manually toward the right along direction 1002C in parallel with direction 1002A, as shown in FIG. 9, to move wiring board 4 and slider 3 toward the right along direction 1002C. Wiring board 4 has rotation sensor 5 and lever switches 7A to 7D mounted thereon. Then, lever 107A of lever switch 7A mounted on an end of direction 1002C of wiring board 4 contacts side wall 21D of case 21 for activating lever switch 7A. The activation of lever switch 7A allows the electronic circuit of the vehicle to detect that actuator 23 moves toward the right along direction 1002C, and to scroll image 15A, such as a map, displayed on display device 15, so that display 15 displays a right side portion of the map currently displayed.

At this moment, movable body 28 fixed to lower end 23D of actuator 23 moves toward the right along direction 1002C, and projections 28A located along direction 1002C of movable body 28 are engaged with projection 27A, thereby preventing movable body 28 from moving in directions perpendicular to direction 1002C. In other words, projection 27A prevents movable body 28 from moving along rotating direction 1002R of actuator 23 shown in FIG. 6. Projections 27A and 28A thus function as rotation suppressor 223 that prevents actuator 23 from rotating when switch 7A is activated.

Since actuator 23 cannot rotate while lever switch 7A is activated, rotation suppressor 223 can prevent the electronic circuit from performing undesired operations other than desired operations, such as the scrolling of image 15A. As illustrated in the drawings (see especially FIGS. 6 and 9), the casing, the actuator, and the rotation suppressor are arranged such that the shortest distance between the actuator-side rotation suppressor portion and the casing-side rotation suppressor portion in the predetermined movement direction perpendicular to the rotation axis is shorter than the shortest distance between the actuator and the casing in the predetermined movement direction perpendicular to the rotation axis.

When actuator 23 is moved along direction 1002D opposite to direction 1002C, or is slid in parallel with direction 1002A, lever switches 7B to 7D provided to ends of wiring board 4 are activated. The electronic circuit detects the activation of switches 7B to 7D, and then, scrolls image 15A, e.g. a map, displayed on display device 15 toward the left or vertically. Since actuator 23 cannot rotate while any one of switches 7A to 7D is activated, rotation suppressor 223 can prevent the electronic circuit from performing undesired operations other than desired operations, such as the scrolling of image 15A.

After actuator 23 is slid, the user having removed a hand from actuator 23, actuator 23, movable body 28, wiring board 4, and slider 3 are restored to the neutral position shown in FIG. 1 due to a spring provided between holder 21A and frame 2 or between supporting hole 2A and stopper 3A of slider 3.

While desired image 15A, such as a desired section of the map, is displayed on display device 15, the user pinches and rotates actuator 23 with fingers and along direction 1002R, as shown in FIG. 6, to allow lower end 23B of actuator 23 to rotate operation shaft 5A, so that rotation sensor 5 detects the rotation. The electronic circuit detects the rotation of shaft 5A, and enlarges or reduces the map, i.e. image 15A, currently displayed.

As shown in FIG. 6, when actuator 23 and movable body 24 are restored to the center of case 21, i.e. the neutral position, in other words, when switches 7A to 7D are not activated, projections 28A of movable body 28 are not engaged with projections 27A, and allow actuator 23 to be rotated smoothly.

The user presses push button 10 provided at the center of actuator 23 with a finger and allows lower end 10B of button 10 to push operation shaft 6A to activate push switch 6. The electronic circuit detects the activation of push switch 6, and, e.g. switches the menu including plural options 15B displayed at the lower portion of display device 15. As discussed above, inputting device 1002 has actuator 23 that can be slid and rotated, and has push button 10 that can be pushed, thereby performing various operations.

When actuator 23 is moved, rotation suppressor 223 prevents actuator 23 from rotating. Rotation suppressor 223 prevents an erroneous operation, for example, prevents actuator 23 from rotating by mistake while the user slides actuator 23, thus allowing inputting device 1002 to perform various operations reliably and easily.

According to Embodiments 1 and 2, actuator 23 is a component separated from movable body 24 or 28. However, actuator 23 and movable body 24 may be unitarily formed to reduce the number of structural components, thereby reducing the cost of inputting device 1001. Actuator 23 and movable body 28 may be unitarily formed to reduce the number of structural components, thereby reducing the cost of inputting device 1002.

According to Embodiments 1 and 2, lever switches 7A to 7D detect a moving direction of actuator 23. Inputting devices 1001 and 1002 may include a combination of a magnet and a magnetic sensor, such as a Hall element, or a combination of a light emitting diode and a photo sensor, such as a photo diode or a photo transistor, in order to detect a moving direction of actuator 23 or slider 3, providing the same effects.

What is claimed is:

1. An inputting device comprising:
a casing comprising a case with an opening, and a cover disposed on the case over the opening;
an actuator mounted in said casing and configured to rotate relative to said casing in a rotation direction about a rotation axis, and move relative to said casing in a predetermined movement direction perpendicular to the rotation axis and parallel to a rotating plane that includes the rotation direction;
an actuator rotation sensor;
an actuator movement sensor; and
wherein said actuator rotation suppressor comprises an actuator-side rotation suppressor portion fixed for rotation with said actuator, and a casing-side rotation suppressor portion fixed to said casing;
wherein said actuator-side rotation suppressor portion is constituted by a movable body fixed to and projecting radially outwardly from said actuator; and
wherein the casing, the actuator, and the rotation suppressor are arranged such that the shortest distance between the actuator-side rotation suppressor portion and the casing-side rotation suppressor portion in the predetermined movement direction perpendicular to the rotation axis is shorter than the shortest distance between the actuator and the casing in the predetermined movement direction perpendicular to the rotation axis.

2. The inputting device of claim 1, wherein
the predetermined position is one of a plurality of predetermined positions,
the movement sensor detects that the actuator moves to any one of the plurality of predetermined positions, and
the rotation suppressor prevents the actuator from rotating when the actuator moves to any one of the plurality of the predetermined positions such that the actuator cannot be rotated when the actuator is positioned at any one of the plurality of the predetermined positions, and allows the actuator to rotate when the actuator is not positioned at one of the plurality of the predetermined positions.

3. The inputting device of claim 1, wherein
the predetermined position is one of a plurality of predetermined positions,
the actuator is configured to move in a plurality of movement directions perpendicular to the rotation axis and parallel to the rotating plane, the plurality of movement directions including said predetermined movement direction, and
the actuator is configured to move in the plurality of movement directions to reach the predetermined positions, respectively.

4. The inputting device of claim 1, wherein
the actuator is configured to move in said predetermined movement direction to reach said predetermined position.

5. The inputting device of claim 1, wherein
the predetermined position is one of a plurality of predetermined positions,
the movement sensor detects that the actuator moves to any one of the plurality of predetermined positions, and the rotation suppressor is arranged so as to prevent the actuator from rotating when the actuator moves to any one of the plurality of the predetermined positions and allows the actuator to rotate when the actuator is not positioned at one of the plurality of the predetermined positions.

6. The inputting device of claim 1, wherein
the predetermined position is one of a plurality of predetermined positions,
the actuator is configured to move in a plurality of movement directions perpendicular to the rotation axis and parallel to the rotating plane, the plurality of movement directions including said predetermined movement direction, and
the actuator is configured to move in the plurality of movement directions to reach the predetermined positions, respectively.

7. The inputting device of claim 1, wherein
the actuator is configured to move in said predetermined movement direction to reach said predetermined position.

8. The inputting device of claim 1, wherein
the shortest distance between the movable body and the casing-side rotation suppressor portion of the rotation suppressor in the predetermined movement direction perpendicular to the rotation axis is shorter than the shortest distance between the actuator and the casing in the predetermined movement direction perpendicular to the rotation axis.

9. The inputting device of claim 8, wherein
the casing-side rotation suppressor portion of the rotation suppressor is composed of an elastic ring, and
the shortest distance between the movable body and the elastic ring in the predetermined movement direction perpendicular to the rotation axis is shorter than the shortest distance between the actuator and the casing in the predetermined movement direction perpendicular to the rotation axis.

10. The inputting device of claim 9, wherein
the actuator rotation sensor detects rotation of the actuator,
the actuator movement sensor detects that the actuator moves to a predetermined position,
the rotation suppressor is arranged so as to prevent the actuator from rotating when the actuator moves to the predetermined position due to frictional engagement of an outer end of the movable body with the elastic ring when the actuator moves to said predetermined position, and so as to allow the actuator to rotate when the actuator is not positioned at the predetermined position.

11. The inputting device of claim 8, wherein
the movable body has a first projection facing the cover,
the casing-side rotation suppressor portion of the rotation suppressor is composed of a second projection facing the movable body, the second projection being fixed to the cover, and
the shortest distance between the first projection and the second projection in the predetermined movement direction perpendicular to the rotation axis is shorter than the shortest distance between the actuator and the casing in the predetermined movement direction perpendicular to the rotation axis.

12. The inputting device of claim 11, wherein
the actuator rotation sensor detects rotation of the actuator,
the actuator movement sensor detects that the actuator moves to a predetermined position,
the rotation suppressor is arranged to prevent the actuator from rotating when the actuator moves to the predetermined position due to engagement of the first projection of the movable body with the second projection when the actuator moves to said predetermined position, and so as to allow the actuator to rotate when the actuator is not positioned at the predetermined position.

13. The inputting device of claim 11, wherein
the first projection of the movable body is one of a plurality of first projections of the movable body that face the cover, and
the actuator is surrounded by the plurality of first projections in plan view.

14. The inputting device of claim 13, wherein
the second projection of the casing-side rotation suppressor portion is one of a plurality of second projections of the casing-side rotation suppressor portion that face the movable body and are fixed to the cover, and
the actuator is surrounded by the plurality of second projections in plan view.

15. The inputting device of claim 1, further comprising
a slider mounted to said casing, said slider being movable relative to said casing in directions perpendicular to said rotation axis;
wherein the shortest distance between the actuator-side rotation suppressor portion and the casing-side rotation suppressor portion in the predetermined movement direction perpendicular to the rotation axis is shorter than the shortest distance between the slider and casing in the predetermined movement direction perpendicular to the rotation axis.

16. The inputting device of claim 1, wherein
the actuator rotation sensor detects rotation of the actuator,
the actuator movement sensor detects that the actuator moves to a predetermined position, and
the rotation suppressor is arranged so as to prevent the actuator from rotating when the actuator moves to the predetermined position such that the actuator cannot be rotated when the actuator is positioned at the predetermined position, and so as to allow the actuator to rotate when the actuator is not positioned at the predetermined position.

* * * * *